United States Patent
Liu et al.

(10) Patent No.: US 11,115,851 B2
(45) Date of Patent: Sep. 7, 2021

(54) CELL MEASUREMENT METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 5 days.

(21) Appl. No.: 16/610,777

(22) PCT Filed: Jun. 16, 2017

(86) PCT No.: PCT/CN2017/088808
§ 371 (c)(1),
(2) Date: Nov. 4, 2019

(87) PCT Pub. No.: WO2018/227632
PCT Pub. Date: Dec. 20, 2018

(65) Prior Publication Data
US 2020/0145864 A1    May 7, 2020

(51) Int. Cl.
*H04W 24/10* (2009.01)
*H04W 28/02* (2009.01)
(Continued)

(52) U.S. Cl.
CPC ....... *H04W 24/10* (2013.01); *H04W 28/0268* (2013.01); *H04W 36/08* (2013.01); *H04W 36/22* (2013.01); *H04W 36/30* (2013.01)

(58) Field of Classification Search
CPC . H04W 24/10; H04W 28/0268; H04W 36/08; H04W 36/22; H04W 36/30
(Continued)

(56) References Cited

U.S. PATENT DOCUMENTS

| 10,305,561 B2 * | 5/2019 | Baek | H04W 16/28 |
| 2013/0229931 A1 * | 9/2013 | Kim | H04W 48/08 370/252 |

(Continued)

FOREIGN PATENT DOCUMENTS

| CN | 102223667 A | 10/2011 |
| CN | 105636106 A | 6/2016 |

(Continued)

OTHER PUBLICATIONS

3GPP TS 23.502 V1.0.0 (Sep. 2017); 3rd Generation Partnership Project; Technical Specification Group Services and System Aspects; Procedures for the 5G System; Stage 2 (Release 15).
(Continued)

*Primary Examiner* — Nghi H Ly
(74) *Attorney, Agent, or Firm* — Young Basile Hanlon & MacFarlane, P.C.

(57) ABSTRACT

A cell measurement method, a terminal device and a network device are provided. The method includes: a terminal device determines specific information of the terminal device, wherein the specific information includes at least one of: traffic information of the terminal device, priority information of the terminal device, and device information of the terminal device; the terminal device adjusts a measurement parameter in a cell measurement process according to the specific information; and the terminal device performs a measurement operation according to the measurement parameter.

14 Claims, 7 Drawing Sheets

(51) Int. Cl.
*H04W 36/08* (2009.01)
*H04W 36/22* (2009.01)
*H04W 36/30* (2009.01)

(58) Field of Classification Search
USPC ............... 370/329, 328, 338, 341, 345, 350
See application file for complete search history.

(56) References Cited

U.S. PATENT DOCUMENTS

| 2015/0109979 | A1  | 4/2015  | Miklos et al. |
| 2015/0215830 | A1* | 7/2015  | Dalsgaard ......... H04W 36/0083 455/444 |
| 2016/0360537 | A1  | 12/2016 | Palenius et al. |
| 2016/0381610 | A1  | 12/2016 | Pu et al. |

FOREIGN PATENT DOCUMENTS

| EP | 1424785    | A2 | 6/2004  |
| EP | 3113543    | A1 | 1/2017  |
| JP | 2010045452 | A  | 2/2010  |
| JP | 2014014038 | A  | 1/2014  |
| JP | 2015525486 | A  | 9/2015  |
| KR | 20110081100 | A | 7/2011  |
| KR | 20150109839 | A | 10/2015 |
| WO | 2008114130 | A2 | 9/2008  |
| WO | 2016137586 | A1 | 9/2016  |

OTHER PUBLICATIONS

3GPP TS 36.300 V13.2.0 (Dec. 2015); 3rd Generation Partnership Project; Technical Specification Group Radio Access Network; Evolved Universal Terrestrial Radio Access (E-UTRA) and Evolved Universal Ten-estrial Radio Access Network (E-UTRAN); Overall description; Stage 2 (Release 13).
European Search Report for European Application No. 17913609.8 dated Jan. 9, 2020.
India First Examination Report for IN Application 201917044943 dated Mar. 22, 2021.
Communication pursuant to Article 94(3) EPC Examination for EP Application 17913609.8 dated Apr. 24, 2021.
Japan Office Action with English Translation for JP Application 2019562570 dated May 21, 2021.
Korea First Office Action with English Translation for KR Application 1020197033403 dated Mar. 30, 2021.

* cited by examiner

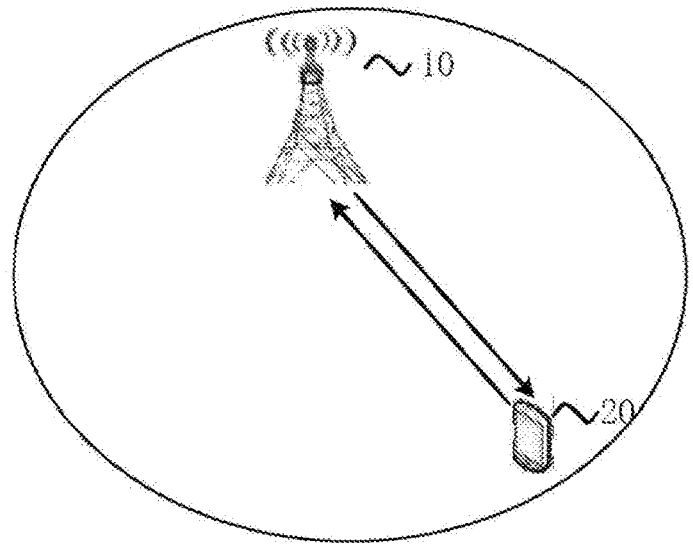

A terminal device determines specific information of the terminal device, wherein the specific information includes at least one of: traffic information of the terminal device, priority information of the terminal device, and device information of the terminal device ～210

The terminal device adjusts a measurement parameter in a cell measurement process according to the specific information ～220

The terminal device performs measurement on a serving cell where the terminal device is located and/or a neighbor cell according to the measurement parameter ～230

FIG. 2

CELL MEASUREMENT METHOD, TERMINAL DEVICE AND NETWORK DEVICE

CROSS-REFERENCE TO RELATED APPLICATION(S)

This application is a 371 application of International Application No. PCT/CN2017/088808, filed on Jun. 16, 2017, the entire disclosure of which is hereby incorporated by reference.

TECHNICAL FIELD

Implementations of the present application relate to the field of wireless communication, and more particularly, relate to a cell measurement method, a terminal device, and a network device.

BACKGROUND

A terminal device performs cell measurement based on some measurement parameters, such as a measurement threshold, and a hysteresis parameter of a measurement event. When a relationship between a measurement result of a cell and the measurement parameters satisfies a preset relationship, the terminal device performs a corresponding measurement event. However, the measurement parameters in the measurement event cannot satisfy measurement demands of all terminal devices, for example, measurement demands of terminal devices with different traffic types. Therefore, how to meet the measurement demands of different terminal devices to perform cell measurement becomes an urgent problem to be solved.

SUMMARY

Implementations of the present application provide a cell measurement method, a terminal device and a network device.

In a first aspect, a cell measurement method is provided. The method includes: a terminal device determines specific information of the terminal device, wherein the specific information includes at least one of: traffic information of the terminal device, priority information of the terminal device, and device information of the terminal device; the terminal device adjusts a measurement parameter in a cell measurement process according to the specific information; and the terminal device performs a measurement operation according to the measurement parameter.

In a possible implementation, the measurement parameter includes at least one of: a hysteresis parameter of a measurement event, a threshold parameter of a measurement event, a report time interval for a measurement result, and a filtering parameter.

In a possible implementation, the traffic information of the terminal device includes at least one of: traffic type information of the terminal device, quality of service (QoS) information of the terminal device, and traffic quality information of the terminal device.

In a possible implementation, the traffic type information of the terminal device includes at least one of: a voice traffic, a data traffic, an emergency traffic, a low delay traffic, and a small data traffic.

In a possible implementation, the QoS information of the terminal device includes at least one of: a traffic delay requirement of the terminal device, and a transmission rate requirement of the terminal device.

In a possible implementation, the traffic quality information of the terminal device includes at least one of: delay of a current traffic of the terminal device, and throughput of a current traffic of the terminal device.

In a possible implementation, the specific information is delay of a current traffic of the terminal device, wherein adjusting, by the terminal device, the measurement parameter in the cell measurement process according to the specific information includes: when the delay of the current traffic is larger than a first threshold, the terminal device shortens filtering time in the cell measurement process, and/or a report time interval for a measurement result.

In a possible implementation, the specific information is throughput of a current traffic of the terminal device, wherein adjusting, by the terminal device, the measurement parameter in the cell measurement process according to the specific information includes: when the throughput of the current traffic is smaller than a second threshold, the terminal device shortens filtering time in the cell measurement process, and/or a report time interval for a measurement result.

In a possible implementation, the specific information is device information of a current traffic of the terminal device, wherein adjusting, by the terminal device, the measurement parameter in the cell measurement process according to the specific information includes: when the terminal device is a terminal device of a power saving type, the terminal device reduces a threshold parameter in the cell measurement process, and/or increases a report time interval for a measurement result.

In a possible implementation, performing, by the terminal device, the measurement operation according to the measurement parameter includes: the terminal device performs measurement on a serving cell where the terminal device is located and/or a neighbor cell according to the measurement parameter; or the terminal device reports a measurement result; or the terminal device performs cell handover according to a measurement result.

In a second aspect, a cell measurement method is provided. The method includes: a network device determines specific information of a terminal device, wherein the specific information includes at least one of: traffic information of the terminal device, priority information of the terminal device, and device information of the terminal device; the network device adjusts a measurement parameter in a cell measurement process according to the specific information; and the network device sends the measurement parameter to the terminal device to enable to the terminal device to perform a measurement operation according to the measurement parameter.

In a possible implementation, the measurement parameter includes at least one of: a hysteresis parameter of a measurement event, a threshold parameter of a measurement event, a report time interval for a measurement result, and a filtering parameter.

In a possible implementation, the traffic information of the terminal device includes at least one of: traffic type information of the terminal device, Quality of Service (QoS) information of the terminal device, and traffic quality information of the terminal device.

In a possible implementation, the traffic type information of the terminal device includes at least one of: a voice traffic, a data traffic, an emergency traffic, a low delay traffic, and a small data traffic.

In a possible implementation, the QoS information of the terminal device includes at least one of: a traffic delay requirement of the terminal device, and a transmission rate requirement of the terminal device.

In a possible implementation, the traffic quality information of the terminal device includes at least one of: delay of a current traffic of the terminal device, and throughput of a current traffic of the terminal device.

In a possible implementation, the specific information is delay of a current traffic of the terminal device, wherein adjusting, by the network device, the measurement parameter in the cell measurement process according to the specific information includes: when the delay of the current traffic is larger than a first threshold, the terminal device shortens filtering time in the cell measurement process, and/or a report time interval for a measurement result.

In a possible implementation, the specific information is throughput of a current traffic of the terminal device, wherein adjusting, by the network device, the measurement parameter in the cell measurement process according to the specific information includes: when the throughput of the current traffic is smaller than a second threshold, the network device shortens filtering time in the cell measurement process, and/or a report time interval for a measurement result.

In a possible implementation, the specific information is the device information of a current traffic of the terminal device, wherein adjusting, by the network device, the measurement parameter in the cell measurement process according to the specific information includes: when the terminal device is a terminal device of a power saving type, the network device reduces a threshold parameter in the cell measurement process, and/or increases a report time interval for a measurement result.

In a third aspect, there is provided a terminal device that may perform operations of the terminal device in the above first aspect or any optional implementation of the first aspect. Specifically, the terminal device may include modules used for performing operations of the terminal device in the above first aspect or any possible implementation of the first aspect.

In a fourth aspect, there is provided a network device that may perform operations of the network device in the above second aspect or any optional implementation of the second aspect. Specifically, the network device may include modules used for performing operations of the network device in the above second aspect or any possible implementation of the second aspect.

In a fifth aspect, there is provided a terminal device. The terminal device includes: a processor, a transceiver, and a memory. The processor, the transceiver, and the memory communicate with each other through an internal connection path. The memory is used for storing instructions, and the processor is used for executing the instructions stored in the memory. When the processor executes the instructions stored in the memory, the execution causes the terminal device to execute the method in the first aspect or any possible implementation of the first aspect, or the execution causes the terminal device to implement the terminal device provided in the third aspect.

In a sixth aspect, there is provided a network device. The network device includes: a processor, a transceiver, and a memory. The processor, the transceiver, and the memory communicate with each other through an internal connection path. The memory is used for storing instructions, and the processor is used for executing the instructions stored in the memory. When the processor executes the instructions stored in the memory, the execution causes the network device to execute the method in the second aspect or any possible implementation of the second aspect, or the execution causes the network device to implement the network device provided in the fourth aspect.

In a seventh aspect, there is provided a computer-readable storage medium storing a program, and the program enables a terminal device to perform any cell measurement method in the above first aspect and any possible implementation of the first aspect.

In an eighth aspect, there is provided a computer-readable storage medium storing a program, and the program enables a network device to perform any cell measurement method in the above second aspect and any possible implementation of the second aspect.

In a ninth aspect, there is provided a system chip. The system chip includes an input interface, an output interface, a processor, and a memory, wherein the processor is used for executing instructions stored in the memory, and when the instructions are executed, the processor may implement the method in the above first aspect or any possible implementation of the first aspect.

In a tenth aspect, there is provided a system chip. The system chip includes an input interface, an output interface, a processor, and a memory, wherein the processor is used for executing instructions stored in the memory, and when the instructions are executed, the processor may implement methods in the above second aspect and any possible implementation of the second aspect.

In an eleventh aspect, a computer program product including instructions is provided, when the computer program product is run on a computer, the computer is enabled to perform the method in the above first aspect or any possible implementation thereof.

In a twelfth aspect, a computer program product including instructions is provided, when the computer program product is run on a computer, the computer is enabled to perform the method in the above second aspect or any possible implementation thereof.

BRIEF DESCRIPTION OF DRAWINGS

FIG. 1 is a schematic diagram of architecture of an application scenario according to an implementation of the present application.

FIG. 2 is a schematic flowchart of a cell measurement method according to an implementation of the present application.

DETAILED DESCRIPTION

Figure 3:
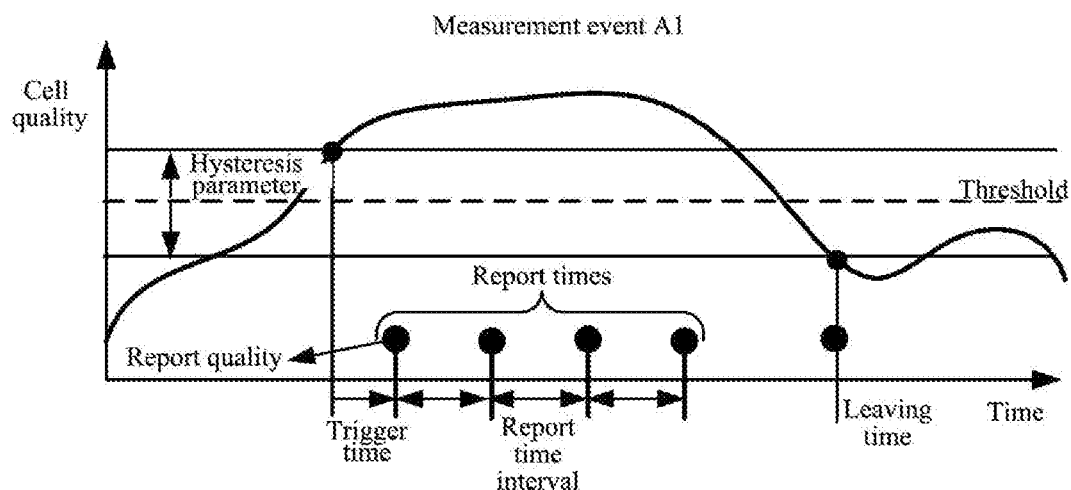
FIG. 3 is a schematic diagram of measurement of a measurement event A1 according to an implementation of the present application.

Hereinafter, technical solutions in implementations of the present application will be described with reference to the accompanying drawings.

It should be understood that the technical solutions of the implementations of the present application may be applied to various communication systems, such as a Global System of Mobile Communication (GSM) system, a Code Division Multiple Access (CDMA) system, a Wideband Code Division Multiple Access (WCDMA) system, a Long Term Evolution (LTE) system, an LTE Frequency Division Duplex (FDD) system, an LTE Time Division Duplex (TDD) system, a Universal Mobile Telecommunication System (UMTS), and a future 5G communication system.

Various implementations are described herein in connection with terminal devices in the present application. The terminal device may also refer to a User Equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or other processing device connected to a wireless modem, an on-board device, a wearable device, a terminal device in a future 5G network, or a terminal device in a future evolving Public Land Mobile Network (PLMN), etc.

Various implementations are described herein in connection with network devices in the present application. A network device may be a device for communicating with a terminal device, such as a base station (Base Transceiver Station, abbreviated as BTS) in a GSM system or CDMA, a base station (NodeB, abbreviated as NB) in a WCDMA system, or an evolved base station (Evolutional Node B, abbreviated as eNB or eNode B) in an LTE system, or the network device may be a relay station, an access point, a vehicle-mounted device, a wearable device, a network side device in a future 5G network, or a network side device in a future evolved PLMN network, etc.

FIG. 1 is a schematic diagram of an application scenario of an implementation of the present application. A communication system in FIG. 1 may include a network device 10 and a terminal device 20. The network device 10 is used for providing communication services for the terminal device 20 and access to a core network. The terminal device 20 may access to the network by searching for a synchronization signal, or a broadcast signal, etc., transmitted by the network device 10 to communicate with the network. Arrows shown in FIG. 1 may represent uplink/downlink transmission through cellular links between the terminal device 20 and the network device 10.

The network in the implementation of the present application may refer to a Public Land Mobile Network (PLMN) or a Device-to-Device (D2D) network or a Machine-to-Machine/man (M2M) network or other networks. FIG. 1 is a simplified schematic diagram of an example, and other terminal devices may be included in the network but are not shown in FIG. 1.

FIG. 2 is a schematic flowchart of a cell measurement method according to an implementation of the present application. The method shown in the FIG. 2 may be performed by a terminal device which may be, for example, the terminal device 20 shown in the FIG. 1. As shown in FIG. 2, the cell measurement method includes following acts 210-230.

In 210, a terminal device determines specific information of the terminal device; wherein the specific information includes at least one of: traffic information of the terminal device, priority information of the terminal device, and device information of the terminal device.

In 220, the terminal device adjusts a measurement parameter in a cell measurement process according to the specific information.

In 230, the terminal device performs a measurement operation according to the measurement parameter.

Specially, the terminal device determines the specific information of it, for example, traffic information of the terminal device, priority information of the terminal device, and device information of the terminal device, etc., and the terminal device adjusts the measurement parameter in the cell measurement process in combination with the specific information, so that the terminal device performs the measurement operation according to the adjusted measurement parameter. When the specific information of the terminal device changes, the terminal device may adjust the measurement parameter of the cell measurement, so that the measurement parameter can match with the specific information of the terminal device. Thus, measurement demands of the terminal device to perform cell measurement under different conditions and measurement demands of different terminal devices to perform cell measurement are better satisfied.

Therefore, the terminal device adjusts flexibly the measurement parameter in the cell measurement process based on the specific information, such as, traffic information of the terminal device, priority information of the terminal device, and device information of the terminal device, and measurement demands of the terminal device to perform cell measurement under different conditions and measurement demands of different terminal devices to perform cell measurement can be better satisfied.

Herein, optionally, performing, by the terminal device, the measurement operation according to the measurement parameter includes: the terminal device performs measurement on a serving cell where the terminal device is located and/or a neighbor cell according to the measurement parameter; or the terminal device reports a measurement result; or the terminal device performs cell handover according to a measurement result.

Optionally, the measurement parameter includes at least one of: a hysteresis parameter (Hys) of a measurement event, a threshold parameter of a measurement event, a report time interval for a measurement result, and a filtering parameter (for example, filtering time).

Optionally, the traffic information of the terminal device includes at least one of: traffic type information of the terminal device, Quality of Service (QoS) information of the terminal device, and traffic quality information of the terminal device.

Optionally, the traffic type information of the terminal device includes at least one of: a voice traffic, a data traffic, an emergency traffic, a low delay traffic, and a small data traffic.

Optionally, the QoS information of the terminal device includes at least one of: a traffic delay requirement of the terminal device, and a transmission rate requirement of the terminal device.

Optionally, the traffic quality information of the terminal device includes at least one of: delay of a current traffic of the terminal device and throughput of a current traffic of the terminal device.

Meanings of the above measurement parameters and measurement events which are possible to be triggered will be described in detail below in combination with FIGS. 3-8. Herein, FIGS. 3-7 are schematic diagrams of measurement of intra-system measurement, and FIG. 8 is a schematic diagram of an inter-system measurement. An intra-system measurement event is represented by Ax, and an inter-system measurement event is represented by Bx.

FIG. 3 is a schematic diagram of measurement of event A1. When quality of a serving cell is higher than an absolute threshold (Threshold), measurement is triggered, and the measurement is reported according to a certain period, i.e., a report time interval for a measurement result. When the quality of the serving cell is lower than the absolute threshold, measurement that is being performed currently is closed. That is, an event entering condition is Ms−Hys>Threshold (see trigger time in the FIG. 3), and an event leaving condition is Ms+Hys<Threshold (see leaving time in the FIG. 3), where Ms is a measurement result of the serving cell (if reference signal received power (RSRP) is measured, a measurement unit is dBm; and if reference signal received quality (RSRQ) is measured, a measurement unit is dB), Hys is a hysteresis parameter of the event A1, of which a unit is dB and a range of values is 0-30 dB; and Threshold is a threshold parameter of the event A1, of which a unit is the same as that of the Ms.

Figure 4:
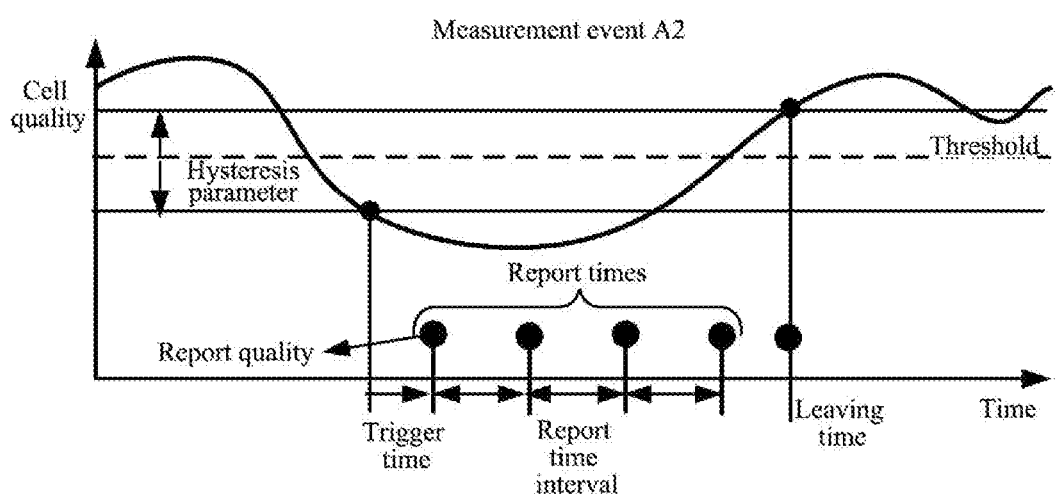
FIG. 4 is a schematic diagram of measurement of a measurement event A2 according to an implementation of the present application.

FIG. 4 is a schematic diagram of measurement of event A2. When quality of a serving cell is lower than an absolute threshold (Threshold), measurement is triggered, and the measurement is reported according to a certain period, i.e., a report time interval. When the quality of the serving cell is higher than the absolute threshold, the measurement that is being performed currently is closed. That is, an event entering condition is Ms+Hys<Threshold (see trigger time in the FIG. 4), and an event leaving condition is Ms−Hys>Threshold (see leaving time in the FIG. 4), where Ms is a measurement result of the serving cell (if RSRP is measured, a measurement unit is dBm; and if RSRQ is measured, a measurement unit is dB), Hys is a hysteresis parameter of the event A1, of which the unit is dB and a range of values is 0-30 dB; and Threshold is a threshold parameter of the event A1, of which the unit is the same as that of Ms.

Figure 5:
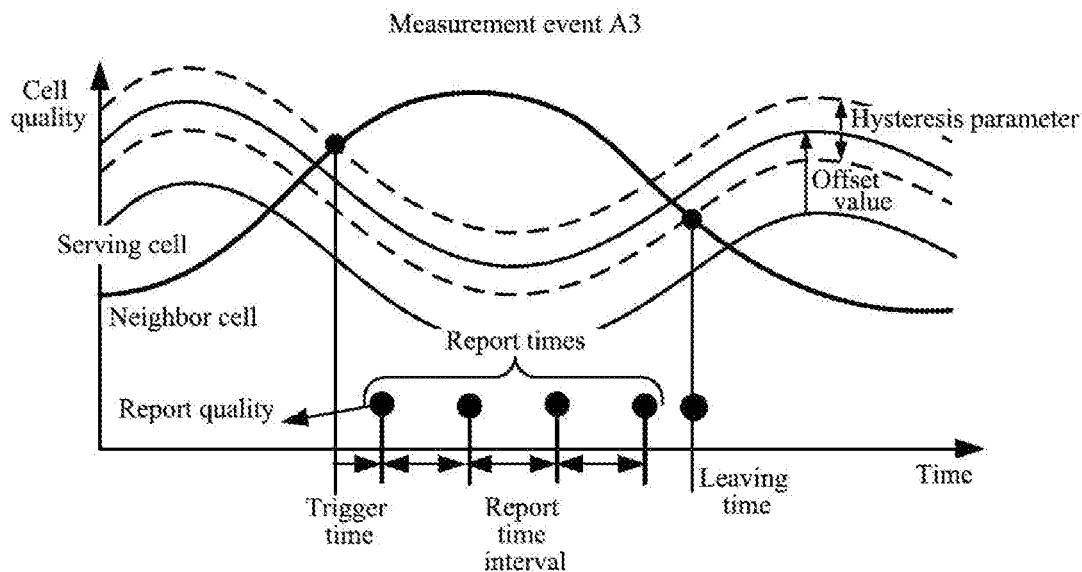
FIG. 5 is a schematic diagram of measurement of a measurement event A3 according to an implementation of the present application.

FIG. 5 is a schematic diagram of measurement of event A3. When quality of a neighbor cell is one threshold (Threshold) higher than that of a serving cell, an intra-frequency or inter-frequency cell handover based on coverage may be performed. That is, an event entering condition is Mn−Offset−Hys>Ms, and an event leaving condition is Mn−Offset+Hys<Ms, where Offset=Offset(A3)+Ofs+Ocs−Ofn−Ocn. Herein, Mn is a measurement result of a neighbor cell, Ofn is a frequency offset of the neighbor cell, Ocn is a cell offset of the neighbor cell (if the cell offset is not configured for the neighbor cell, the Ocn is 0), Offset (A3) is an offset value of the event A3, Ms is a measurement result of a serving cell, Ofs is a frequency offset of the serving cell, Ocs is a cell offset of the serving cell (if the cell offset is not configured for the serving cell, the Ocs is 0), Hys is a hysteresis parameter of the event A1, and the unit of each of Ofn, Ocn, Ofs, Ocs, Hys, and Offset(A3) is dB.

Figure 6:
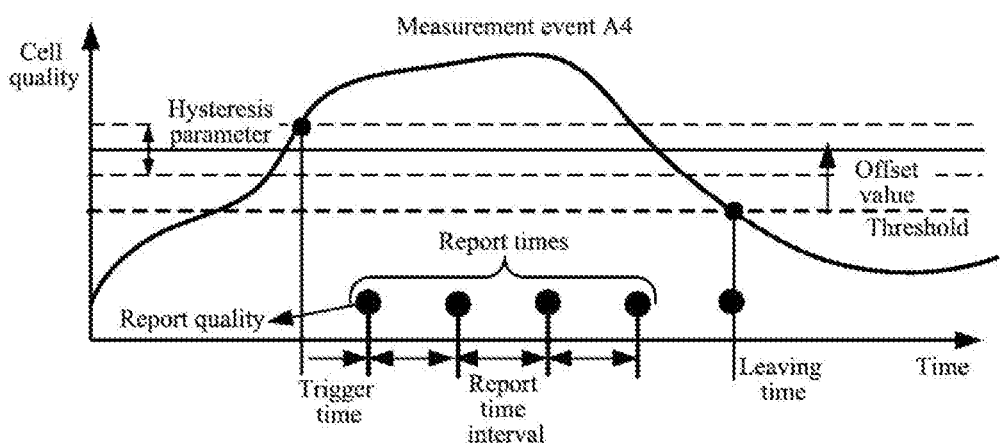
FIG. 6 is a schematic diagram of measurement of a measurement event A4 according to an implementation of the present application.

FIG. 6 is a schematic diagram of measurement of event A4. When quality of a serving cell is higher than an absolute threshold (Threshold), a cell handover based on load may be performed for load balancing, which is similar to a reselection when moving to a cell with a high priority. That is, an event entering condition is Mn+Offset−Hys>Threshold, and an event leaving condition is Mn+Offset+Hys<Threshold, where Offset=Ofn+Ocn.

Figure 7:
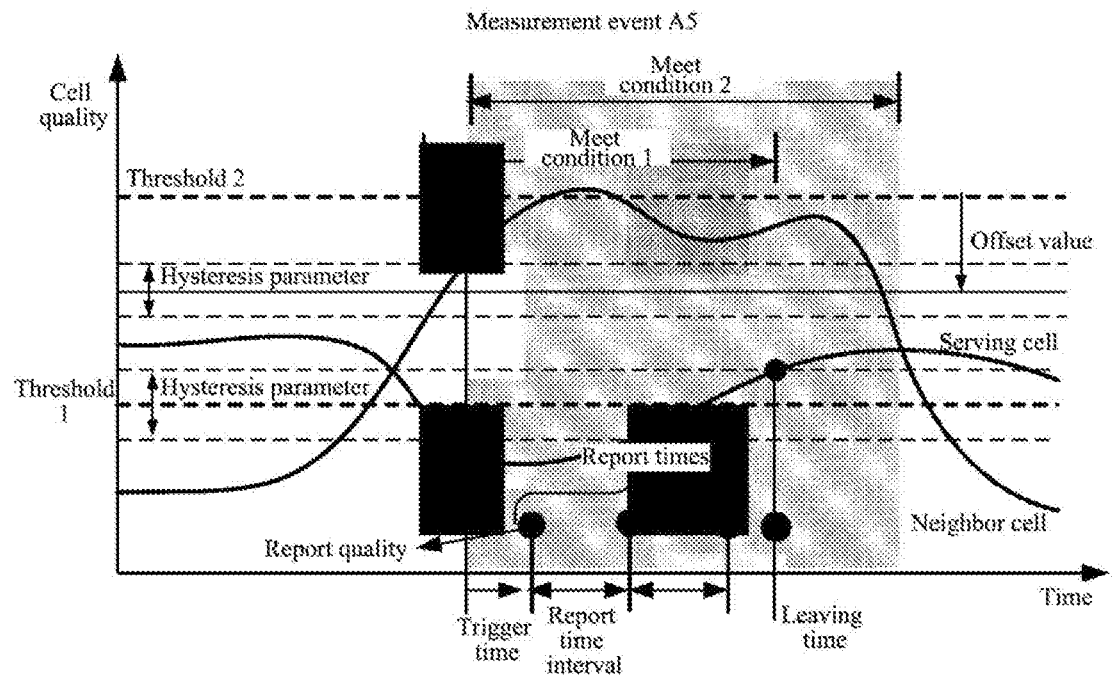
FIG. 7 is a measurement diagram of a measurement event A5 according to an implementation of the present application.
Figure 8:
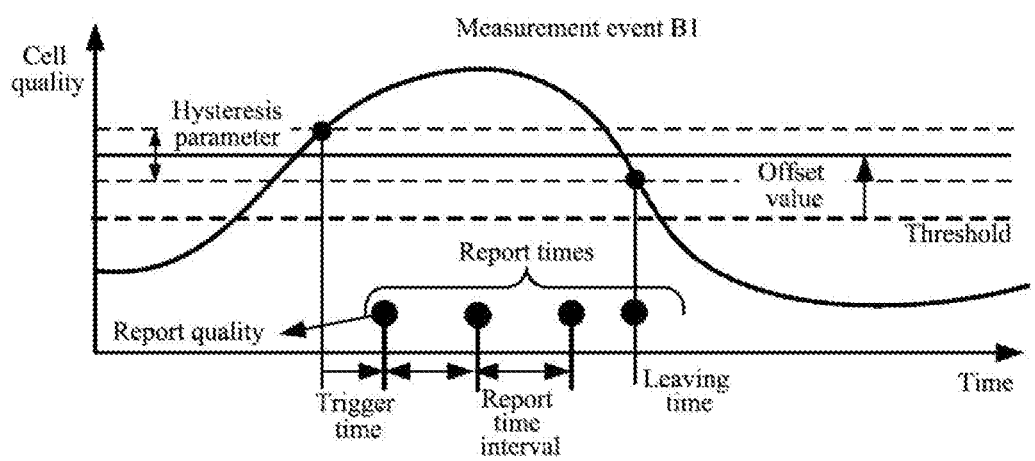
FIG. 8 is a schematic diagram of measurement of a measurement event B1 according to an implementation of the present application.

FIG. 7 is a schematic diagram of measurement of event A5. When quality of a serving cell is lower than an absolute threshold (Threshold 1) and quality of a neighbor cell is higher than an absolute threshold (Threshold 2), an intra-frequency or inter-frequency cell handover based on coverage may be performed for load balancing, which is similar to reselection when moving to a cell with a low priority. That is, an event entering condition is Ms+Hys<Threshold 1 and Mn+Offset−Hys>Threshold 2, and an event leaving condition is Ms−Hys>Threshold 1 or Mn+Offset+Hys<Threshold 2, where Offset=Ofn+Ocn.

FIG. 8 is a schematic diagram of measurement of event B1. When quality of a neighbor cell is higher than an absolute threshold (Threshold), measurement of a Radio Access Type (RAT) cell with a high priority is triggered, and the measurement is reported according to a certain period, i.e., a report time interval. When the quality of the serving cell is higher than the absolute threshold, the measurement that is being performed currently is closed. That is, an event entering condition is Mn+Ofn−Hys>Threshold, and an event leaving condition is Mn+Ofn+Hys<Threshold.

In 220, the terminal device adjusts the above measurement parameters in the cell measurement process according to the relevant specific information, and in 230, triggers or closes the measurement events in FIGS. 3-8 or other measurement events based on the adjusted measurement parameters, thus realizing the measurement, reporting, or handover of the serving cell and/or the neighbor cell. After the terminal device completes the measurement, the terminal device may estimate a reporting condition according to measurement report configuration. When the reporting condition is met, the terminal device writes the measurement result into a measurement report message to send to the network device.

For example, if the specific information is delay of a current traffic of the terminal device, said adjusting, by the terminal device, the measurement parameter in the cell measurement process according to the specific information in the act 220, includes: when the delay of the current traffic is larger than a first threshold, the terminal device shortens filtering time in the cell measurement process, and/or a report time interval for a measurement result.

For another example, if the specific information is throughput of a current traffic of the terminal device, said adjusting, by the terminal device, the measurement parameter in the cell measurement process according to the specific information in the act 220, includes: when the throughput of the current traffic is smaller than a second threshold, the terminal device shortens filtering time in the cell measurement process, and/or a report time interval for a measurement result.

For another example, if the specific information is the device information of a current traffic of the terminal device, said adjusting, by the terminal device, the measurement parameter in the cell measurement process according to the specific information in the act 220, includes: when the terminal device is a terminal device of a power saving type, the terminal device reduces a threshold parameter in the cell measurement process, and/or increases a report time interval for a measurement result.

For another example, if the terminal device is relatively sensitive to delay, or a priority of the terminal device is relatively high, or a priority of the current traffic of the terminal device is relatively high, the terminal device may not perform handover to reduce influence on data transmission due to the cell handover.

It should be understood that in implementations of the present application, sequence numbers of the processes do not imply an order of execution of the processes, which should be determined by their functions and internal logics, and should not constitute any limitation on implementation processes of the implementations of the present application.

Figure 9:
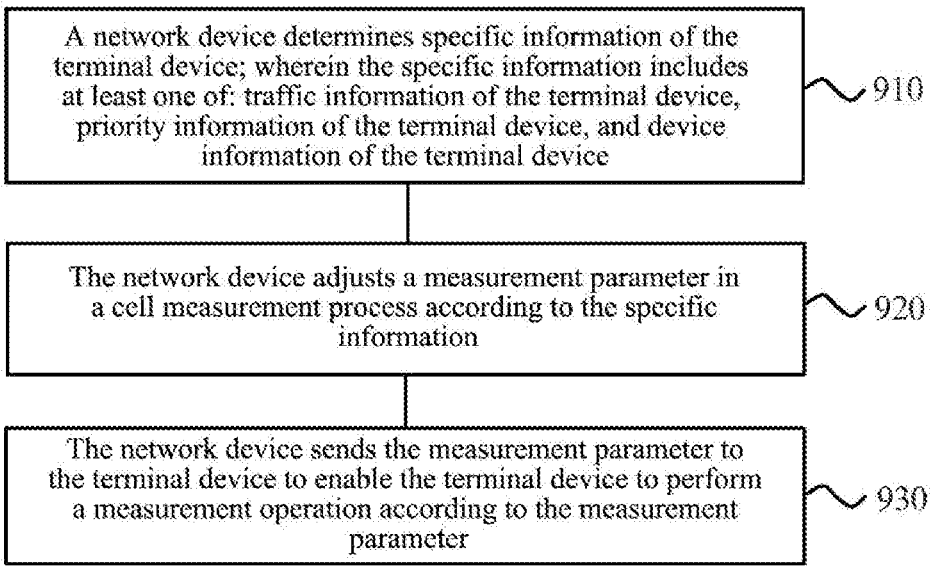
FIG. 9 is a schematic flowchart of a cell measurement method according to an implementation of the present application.

FIG. 9 is a schematic flowchart of a cell measurement method according to an implementation of the present application. The method shown in the FIG. 9 may be performed by a network device which may be, for example, the network device 10 shown in the FIG. 1. As shown in FIG. 9, the cell measurement method includes following acts 910-930.

In 910, a network device determines specific information of the terminal device, wherein the specific information includes at least one of: traffic information of the terminal device, priority information of the terminal device, and device information of the terminal device.

In 920, the network device adjusts a measurement parameter in a cell measurement process according to the specific information.

In 930, the network device sends the measurement parameter to the terminal device to enable the terminal device to perform a measurement operation according to the measurement parameter.

Specially, the network device determines the specific information of the terminal device, for example, traffic information of the terminal device, priority information of the terminal device, and device information of the terminal device, etc., and the terminal device adjusts the measurement parameter in the cell measurement process in combination with the specific information, so that the terminal device performs the measurement operation according to the adjusted measurement parameter. When the specific information of the terminal device changes, the network device may adjust the measurement parameter of the cell measurement for the terminal device, so that the measurement parameter can match with the specific information of the terminal device. Thus, measurement demands of the terminal device to perform cell measurement under different conditions and measurement demands of different terminal devices to perform cell measurement can be better satisfied.

In the implementation of the present application, the network device adjusts flexibly the measurement parameter in the cell measurement process based on the specific information, such as, traffic information of the terminal device, priority information of the terminal device, and device information of the terminal device, and indicates the adjusted measurement parameter to the terminal device, thereby measurement demands of the terminal device to perform cell measurement under different conditions and measurement demands of different terminal devices to perform cell measurement can be better satisfied.

Herein, optionally, the measurement parameter includes at least one of: a hysteresis parameter of a measurement event, a threshold parameter of a measurement event, a report time interval for a measurement result, and a filtering parameter.

Optionally, the traffic information of the terminal device includes at least one of: traffic type information of the terminal device, Quality of Service (QoS) information of the terminal device, and traffic quality information of the terminal device.

Optionally, the traffic type information of the terminal device includes at least one of: a voice traffic, a data traffic, an emergency traffic, a low delay traffic, and a small data traffic.

Optionally, the QoS information of the terminal device includes at least one of: a traffic delay requirement of the terminal device, and a transmission rate requirement of the terminal device.

Optionally, the traffic quality information of the terminal device includes at least one oft: delay of a current traffic of the terminal device, and throughput of a current traffic of the terminal device.

Optionally, the specific information is delay of a current traffic of the terminal device, and said adjusting, by the terminal device, the measurement parameter in the cell measurement process according to the specific information includes: when the delay of the current traffic is larger than a first threshold, the terminal device shortens filtering time in the cell measurement process, and/or a report time interval for a measurement result.

Optionally, the specific information is throughput of a current traffic of the terminal device, and said adjusting, by the terminal device, the measurement parameter in the cell measurement process according to the specific information includes: when the throughput of the current traffic is lower than a second threshold, the network device shortens filtering time in the cell measurement process, and/or a report time interval for a measurement result.

Optionally, the specific information is device information of a current traffic of the terminal device, and said adjusting, by the terminal device, the measurement parameter in the cell measurement process according to the specific information includes: when the terminal device is a terminal device of a power saving type, the network device reduces a threshold parameter in the cell measurement process, and/or increases a report time interval for a measurement result.

Optionally, if the terminal device is relatively sensitive to the delay, or a priority of the terminal device is relatively high, or a priority of the current traffic of the terminal device is relatively high, the network device may further indicate the terminal device not to perform handover to reduce influence on data transmission due to the cell handover.

It should be understood that the detailed process in which the network device adjusts the measurement parameter according to specific parameters of the terminal device may refer to the relevant descriptions for the terminal device in the above FIGS. 2-8, which is not repeated For the sake of brevity.

It should be understood that in various implementations of the present invention, values of sequence numbers in the aforementioned processes do not indicate an order of execution, and the order of execution of various processes should be determined by their functions and internal logics, and should not constitute any limitation on implementation processes of implementations of the present application.

Figure 10:
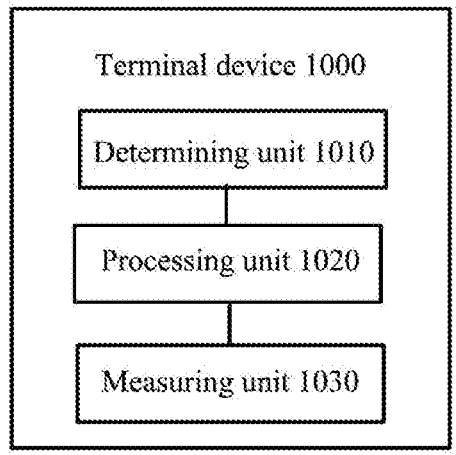
FIG. 10 is a schematic block diagram of a network device according to an implementation of the present application.

FIG. 10 is a schematic block diagram of a terminal device 1000 according to an implementation of the present application. As shown in FIG. 10, the terminal device 1000 includes a determining unit 1010, a processing unit 1020 and a measuring unit 1030. The determining unit 1010 is used for determining specific information of the terminal device, wherein the specific information includes at least one of: traffic information of the terminal device, priority information of the terminal device, and device information of the terminal device.

The processing unit 1020 is used for adjusting a measurement parameter in a cell measurement process according to the specific information determined by the determining unit 1010.

The measuring unit 1030 is used for performing a measuring operation according to the measurement parameter adjusted by the processing unit 1020.

Therefore, the terminal device adjusts flexibly the measurement parameter in the cell measurement process based on the specific information, such as, traffic information of the terminal device, priority information of the terminal device, and device information of the terminal device, thereby measurement demands of the terminal device to perform cell measurement under different conditions and measurement demands of different terminal devices to perform cell measurement can be better satisfied.

Optionally, the measurement parameter includes at least one of: a hysteresis parameter of a measurement event, a threshold parameter of a measurement event, a report time interval for a measurement result, and a filtering parameter.

Optionally, the traffic information of the terminal device includes at least one of: traffic type information of the terminal device, Quality of Service (QoS) information of the terminal device, and traffic quality information of the terminal device.

Optionally, the traffic type information of the terminal device includes at least one of: a voice traffic, a data traffic, an emergency traffic, a low delay traffic, and a small data traffic.

Optionally, the QoS information of the terminal device includes at least one of: a traffic delay requirement of the terminal device, and a transmission rate requirement of the terminal device.

Optionally, the traffic quality information of the terminal device includes at least one of: delay of a current traffic of the terminal device, and throughput of the current traffic of the terminal device.

Optionally, the specific information is delay of a current traffic of the terminal device, and the processing unit 1020 is specifically used for, when the delay of the current traffic is larger than a first threshold, shortening filtering time in the cell measurement process, and/or a report time interval for a measurement result.

Optionally, the specific information is throughput of a current traffic of the terminal device, and the processing unit 1020 is specifically used for, when the throughput of the current traffic is smaller than a second threshold, shortening filtering time in the cell measurement process, and/or a report time interval for a measurement result.

Optionally, the specific information is the device information of a current traffic of the terminal device, and the processing unit 1020 is specifically used for, when the terminal device is a terminal device of a power saving type, reducing a threshold parameter in the cell measurement process, and/or increases a report time interval for a measurement result.

Optionally, the measuring unit 1030 is specifically used for: performing measurement on a serving cell where the terminal device is located and/or a neighbor cell according to the measurement parameter; or reporting a measurement result; or performing cell handover according to a measurement result.

Figure 11:
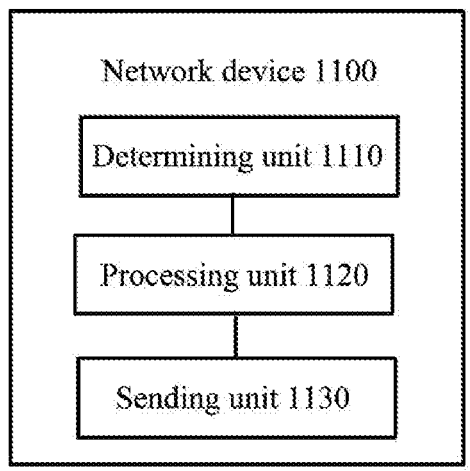
FIG. 11 is a schematic block diagram of a terminal device according to an implementation of the present application.

FIG. 11 is a schematic block diagram of a network device 1100 according to an implementation of the present application. As shown in FIG. 11, the network device 1100 includes a determining unit 1110, a processing unit 1120 and a sending unit 1130. The determining unit 1110 is used for determining specific information of the terminal device, wherein the specific information includes at least one of: traffic information of the terminal device, priority information of the terminal device, and device information of the terminal device.

The processing unit 1120 is used for adjusting a measurement parameter in a cell measurement process according to the specific information determined by the determining unit 1110.

The sending unit 1130 is used for sending the measurement parameter adjusted by the processing unit 1120 to the terminal device to enable the terminal device to perform a measurement operation according to the measurement parameter.

Therefore, the network device adjusts flexibly the measurement parameter in the cell measurement process based on the specific information, such as, traffic information of the terminal device, priority information of the terminal device, and device information of the terminal device, and indicates the adjusted measurement parameter to the terminal device, thereby measurement demands of the terminal device to perform cell measurement under different conditions and measurement demands of different terminal devices to perform cell measurement can be better satisfied.

Optionally, the measurement parameter includes at least one of: a hysteresis parameter of a measurement event, a threshold parameter of a measurement event, a report time interval for a measurement result, and a filtering parameter.

Optionally, the traffic information of the terminal device includes at least one of: traffic type information of the terminal device, Quality of Service (QoS) information of the terminal device, and traffic quality information of the terminal device.

Optionally, the traffic type information of the terminal device includes at least one of: a voice traffic, a data traffic, an emergency traffic, a low delay traffic, and a small data traffic.

Optionally, the QoS information of the terminal device includes at least one of: a traffic delay requirement of the terminal device, and a transmission rate requirement of the terminal device.

Optionally, the traffic quality information of the terminal device includes at least one of: delay of a current traffic of the terminal device, and throughput of a current traffic of the terminal device.

Optionally, the specific information is delay of a current traffic of the terminal device, and the processing unit 1120 is specifically used for, when the delay of the current traffic is larger than a first threshold, shortening filtering time in the cell measurement process, and/or a report time interval for a measurement result.

Optionally, the specific information is throughput of a current traffic of the terminal device, and the processing unit 1120 is specifically used for, when the throughput of the current traffic is smaller than a second threshold, shortening filtering time in the cell measurement process, and/or a report time interval for a measurement result.

Optionally, the specific information is device information of a current traffic of the terminal device, and the processing unit 1120 is specifically used for, when the terminal device is a terminal device of a power saving type, reducing a threshold parameter in the cell measurement process, and/or increases a report time interval for a measurement result.

Figure 12:
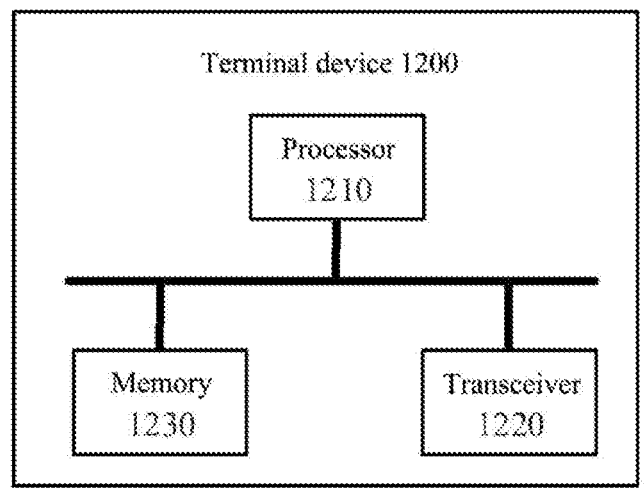
FIG. 12 is a schematic diagram of structure of a network device according to an implementation of the present application.

FIG. 12 is a schematic diagram of structure of a terminal device 1200 according to an implementation of the present application. As shown in FIG. 12, the terminal device includes a processor 1210, a transceiver 1220, and a memory 1230. The processor 1210, the transceiver 1220, and the memory 1230 communicate with each other through an internal connection path. The memory 1230 is used for storing instructions, and the processor 1210 is used for executing instructions stored in the memory 1230 to control the transceiver 1220 to send or receive signals. Herein, the processor 1210 is used for: determining specific information of the terminal device, wherein the specific information includes at least one of: traffic information of the terminal device, priority information of the terminal device, and device information of the terminal device; adjusting a measurement parameter in a cell measurement process according to the specific information; and performing a measurement operation according to the measurement parameter.

Therefore, the terminal device adjusts flexibly the measurement parameter in the cell measurement process based on the specific information, such as, traffic information of the terminal device, priority information of the terminal device, and device information of the terminal device, therefore measurement demands of the terminal device to perform cell measurement under different conditions and measurement demand of different terminal devices to perform cell measurement can be better satisfied.

Optionally, the measurement parameter includes at least one of: a hysteresis parameter of a measurement event, a threshold parameter of a measurement event, a report time interval for a measurement result, and a filtering parameter.

Optionally, the traffic information of the terminal device includes at least one of: traffic type information of the terminal device, Quality of Service (QoS) information of the terminal device, and traffic quality information of the terminal device.

Optionally, the traffic type information of the terminal device includes at least one of: a voice traffic, a data traffic, an emergency traffic, a low delay traffic, and a small data traffic.

Optionally, the QoS information of the terminal device includes at least one of: a traffic delay requirement of the terminal device, and a transmission rate requirement of the terminal device.

Optionally, the traffic quality information of the terminal device includes at least one of: delay of a current traffic of the terminal device, and throughput of the current traffic of the terminal device.

Optionally, the specific information is delay of a current traffic of the terminal device, and the processor 1210 is specifically used for, when the delay of the current traffic is larger than a first threshold, shortening filtering time in the cell measurement process, and/or a report time interval for a measurement result.

Optionally, the specific information is throughput of a current traffic of the terminal device, and the processor 1210 is specifically used for, when the throughput of the current traffic is smaller than a second threshold, shortening filtering time in the cell measurement process, and/or a report time interval for a measurement result.

Optionally, the specific information is the device information of a current traffic of the terminal device, and the processor 1210 is specifically used for, when the terminal device is a terminal device of a power saving type, reducing a threshold parameter in the cell measurement process, and/or increases a report time interval for a measurement result.

Optionally, the processor 1210 is specifically used for: performing measurement on a serving cell where the terminal device is located and/or a neighbor cell according to the measurement parameter; or reporting a measurement result; or performing cell handover according to a measurement result.

It should be understood that, in an implementation of the present application, the processor 1210 may be a central processing unit (CPU), or the processor 1210 may be other general purpose processor, a digital signal processor (DSP), an application specific integrated circuit (ASIC), a field programmable gate array (FPGA) or other programmable logic device, a discrete gate or a transistor logic device, or a discrete hardware component, etc. The general purpose processor may be a microprocessor or the processor may be any conventional processor or the like.

The memory 1230 may include a read-only memory and a random access memory, and provide instructions and data to the processor 1210. A portion of memory 1230 may include a non-volatile random access memory.

In an implementation process, the acts of the methods described above may be accomplished by integrated logic circuits of hardware in the processor 1210 or instructions in a form of software. The acts of the cell measurement method disclosed in the implementations of the present application may be directly accomplished by an execution of a hardware processor or accomplished by a combination of hardware and software modules in the processor 1210. The software modules may be located in a storage medium commonly used in the art, such as a random access memory, flash memory, read-only memory, programmable read-only memory or electrically erasable programmable memory, or register. The storage medium is located in the memory 1230, and the processor 1210 reads the information in the memory 1230 and accomplishes the acts of the above method in combination with its hardware. In order to avoid repetition, it will not be described in detail here.

The terminal device 1200 according to the implementation of the present application may correspond to the terminal device for executing the method 200 in the method 200 and the terminal device 1000 according to the implementation of the present application, and various units or modules in the terminal device 1200 are respectively used for executing various actions or processing processes executed by the terminal device in the method 200. Here, in order to avoid redundancy, detailed description thereof is omitted.

Figure 13:
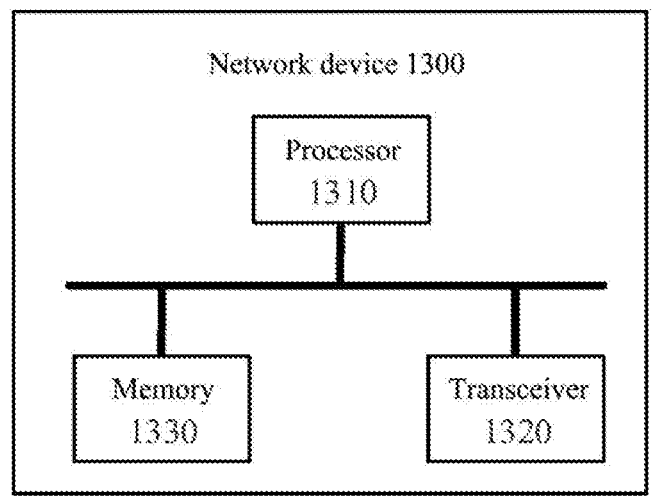
FIG. 13 is a schematic diagram of structure of a terminal device according to an implementation of the present application.

FIG. 13 is a schematic diagram of structure of a network device 1300 according to an implementation of the present application. As shown in FIG. 13, the network device includes a processor 1310, a transceiver 1320, and a memory 1330. The processor 1310, the transceiver 1320, and the memory 1330 communicate with each other through an internal connection path. The memory 1330 is used for storing instructions, and the processor 1310 is used for executing instructions stored in the memory 1330 to control the transceiver 1320 to send or receive signals. Herein, the processor 1310 is used for: determining specific information of a terminal device; wherein the specific information includes at least one of the following: traffic information of the terminal device, priority information of the terminal device, and device information of the terminal device; adjusting a measurement parameter in a cell measurement process according to the specific information.

The transceiver 1320 is used for sending the measurement parameter to the terminal device, so that the terminal device performs a measurement operation according to the measurement parameter.

Optionally, the measurement parameter includes at least one of: a hysteresis parameter of a measurement event, a threshold parameter of a measurement event, a report time interval for a measurement result, and a filtering parameter.

Optionally, the traffic information of the terminal device includes at least one of: traffic type information of the terminal device, Quality of Service (QoS) information of the terminal device, and traffic quality information of the terminal device.

Optionally, the traffic type information of the terminal device includes at least one of the following: a voice traffic, a data traffic, an emergency traffic, a low delay traffic, and a small data traffic.

Optionally, the QoS information of the terminal device includes at least one of: a traffic delay requirement of the terminal device, and a transmission rate requirement of the terminal device.

Optionally, the traffic quality information of the terminal device includes at least one of: delay of a current traffic of the terminal device, and throughput of a current traffic of the terminal device.

Optionally, the specific information is delay of a current traffic of the terminal device, and the processor 1310 is specifically used for, when the delay of the current traffic is larger than a first threshold, shortening filtering time in the cell measurement process, and/or a report time interval for a measurement result.

Optionally, the specific information is throughput of a current traffic of the terminal device, and the processor 1310 is specifically used for, when the throughput of the current traffic is smaller than a second threshold, shortening filtering time in the cell measurement process, and/or a report time interval for a measurement result.

Optionally, the specific information is the device information of a current traffic of the terminal device, and the processor 1310 is specifically used for, when the terminal device is a terminal device of a power saving type, reducing a threshold parameter in the cell measurement process, and/or increases a report time interval for a measurement result.

It should be understood that in the implementation of the present application, the processor 1310 may be a Central Processing Unit (CPU), or the processor 1310 may be other general purpose processors, digital signal processors (DSP), application specific integrated circuits (ASIC), Field programmable gate arrays (FPGA) or other programmable logic devices, discrete gate or transistor logic devices, discrete hardware components, etc. The general purpose processor may be a microprocessor or the processor may be any conventional processor or the like.

The memory 1330 may include a read-only memory and a random access memory, and provide instructions and data to the processor 1310. A portion of memory 1330 may include a non-volatile random access memory. In an implementation process, the acts of the methods described above may be accomplished by integrated logic circuits of hardware in the processor 1310 or instructions in a form of software. The acts of the cell measurement method disclosed in the implementation of the present application may be directly accomplished by an execution of a hardware processor or accomplished by a combination of hardware and software modules in the processor 1310. The software modules may be located in a storage medium commonly used in the art, such as a random access memory, flash memory, read-only memory, programmable read-only memory or electrically erasable programmable memory, or register. The storage medium is located in the memory 1330, and the processor 1310 reads the information in the memory 1330 and accomplishes the acts of the above method in combination with its hardware. In order to avoid repetition, it will not be described in detail here.

The network device 1300 according to the implementation of the present application may correspond to the network device for executing the method 900 in the method 900 and the network device 1100 according to the implementation of the present application, and various units or modules in the network device 1300 are respectively used for executing various actions or processing processes executed by the network device in the method 900. Here, in order to avoid redundancy, detailed description thereof is omitted.

Figure 14:
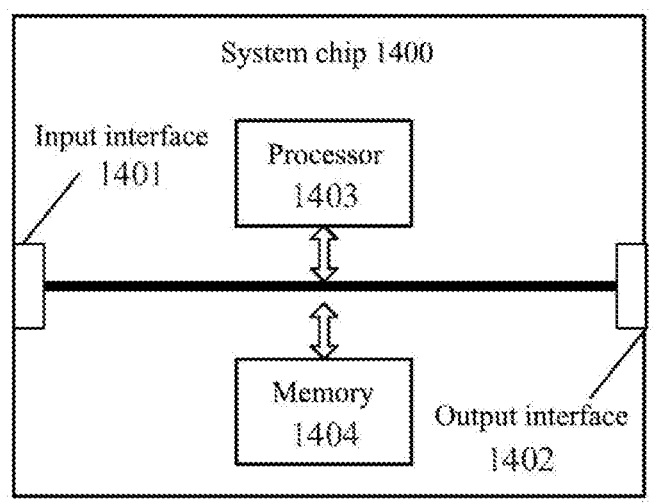
FIG. 14 is a schematic diagram of structure of a system chip according to an implementation of the present application.

FIG. 14 is a schematic diagram of structure of a system chip according to an implementation of the present application. The system chip 1400 of FIG. 14 includes an input interface 1401, an output interface 1402, at least one processor 1403, and a memory 1404. The input interface 1401, the output interface 1402, the processor 1403, and the memory 1404 are connected to each other through an internal connection path. The processor 1403 is used for executing codes in the memory 1404.

Optionally, the processor 1403 may implement the method 200 executed by the terminal device in the method implementation when the codes are executed. For the sake of brevity, it will not be repeated here.

Optionally, the processor 1403 may implement the method 900 executed by the network device in the method implementation when the codes are executed. For the sake of brevity, it will not be repeated here.

Those of ordinary skill in the art will recognize that the exemplary units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different manners to realize the described functions for each particular application, but such realization should not be considered to be beyond the scope of the present application.

Those skilled in the art may clearly understand that for convenience and conciseness of description, the specific working process of the system, device and unit described above may refer to the corresponding process in the aforementioned implementations of methods, and details are not described herein again.

In several implementations provided by the present application, it should be understood that the disclosed systems, apparatuses and methods may be implemented in other ways. For example, the apparatus implementation described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The unit described as a separate component may or may not be physically separated, and the component shown as a unit may or may not be a physical unit, i.e., may be located in one place or may be distributed over multiple network units. Some or all of the units may be selected according to practical needs to achieve a purpose of the solution of the implementations.

In addition, various functional units in various implementations of the present application may be integrated in one monitoring unit, or various units may be physically present separately, or two or more units may be integrated in one unit.

The functions may be stored in a computer readable storage medium if implemented in a form of software functional units and sold or used as a separate product. Based on this understanding, the technical solution of the present application, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present application. The aforementioned storage medium includes various media capable of storing program codes, such as a U disk, a mobile hard disk, a read-only memory (ROM), a random access memory (RAM), a magnetic disk, or an optical disk.

What are described above are merely exemplary implementations of the present application, but the protection scope of the present application is not limited thereto. Any variation or substitution that may be easily conceived by a person skilled in the art within the technical scope disclosed by the present application shall be included within the protection scope of the present application. Therefore, the protection scope of the implementations of the present application should be based on the protection scope of the claims.

The invention claimed is:

1. A method for cell measurement, comprising:
determining, by a terminal device, specific information of the terminal device, wherein the specific information comprises at least one of: traffic information of the terminal device, priority information of the terminal device, and device information of the terminal device;
adjusting, by the terminal device, a measurement parameter in a cell measurement process according to the specific information; and
performing, by the terminal device, a measurement operation according to the measurement parameter,
wherein the specific information is delay of a current traffic of the terminal device, and
wherein adjusting, by the terminal device, the measurement parameter in the cell measurement process according to the specific information comprises:
when the delay of the current traffic is larger is larger than a first threshold, shortening, by the terminal device, filtering time in the cell measurement process and/or a report time interval for a measurement result.

2. The method according to claim 1, wherein the measurement parameter comprises at least one of: a hysteresis parameter of a measurement event, a threshold parameter of a measurement event, a report time interval for a measurement result, and a filtering parameter.

3. The method according to claim 1, wherein the traffic information of the terminal device comprises at least one of: traffic type information of the terminal device, Quality of Service (QoS) information of the terminal device, and traffic quality information of the terminal device.

4. The method according to claim 3, wherein the traffic type information of the terminal device comprises at least one of:
a voice traffic, a data traffic, an emergency traffic, a low delay traffic, and a small data traffic.

5. The method according to claim 3, wherein the Quality of Service (QoS) information of the terminal device comprises at least one of:
a traffic delay requirement of the terminal device, and a transmission rate requirement of the terminal device.

6. The method according to claim 3, wherein the traffic quality information of the terminal device comprises at least one of:
delay of a current traffic of the terminal device, and throughput of a current traffic of the terminal device.

7. A terminal device, comprising:
a memory used for storing instructions;
a processor used for executing the instructions stored in the memory to perform acts of:
determining specific information of the terminal device, wherein the specific information comprises at least one of: traffic information of the terminal device, priority information of the terminal device, and device information of the terminal device, and
wherein the specific information is delay of a current traffic of the terminal device;
adjusting a measurement parameter in a cell measurement process according to the determined specific information;
performing a measuring operation according to the adjusted measurement parameter; and
when the delay of the current traffic is larger than a first threshold, shortening filtering time in the cell measurement process and/or a report time interval for a measurement result; and
a transceiver used for sending or receiving signals.

8. The terminal device according to claim 7, wherein the processor is specifically used for: performing measurement on a serving cell where the terminal device is located and/or a neighbor cell according to the measurement parameter; or
reporting a measurement result; or
performing cell handover according to a measurement result.

9. A network device, comprising:
a memory used for storing instructions;
a processor used for executing the instructions stored in the memory to perform acts of:
determining specific information of a terminal device; wherein the specific information comprises at least one of: traffic information of the terminal device, priority information of the terminal device, and device information of the terminal device; and
wherein the specific information is delay of a current traffic of the terminal device;
adjusting a measurement parameter in a cell measurement process according to the determined specific information; and when the delay of the current traffic is larger than a first threshold, shortening filtering time in the cell measurement process and/or a report time interval for a measurement result; and a transceiver used for sending the adjusted measurement parameter to the terminal device to enable the terminal device to perform a measurement operation according to the measurement parameter.

10. The network device according to claim 9, wherein the measurement parameter comprises at least one of:

a hysteresis parameter of a measurement event, a threshold parameter of a measurement event, a report time interval for a measurement result, and a filtering parameter.

11. The network device according to claim 9, wherein the traffic information of the terminal device comprises at least one of:

traffic type information of the terminal device, Quality of Service (QoS) information of the terminal device, and traffic quality information of the terminal device.

12. The network device according to claim 11, wherein the traffic type information of the terminal device comprises at least one of:

a voice traffic, a data traffic, an emergency traffic, a low delay traffic, and a small data traffic.

13. The network device according to claim 11, wherein the Quality of Service (QoS) information of the terminal device comprises at least one of:

a traffic delay requirement of the terminal device, and a transmission rate requirement of the terminal device.

14. The network device according to claim 11, wherein the traffic quality information of the terminal device comprises at least one of:

delay of a current traffic of the terminal device, and throughput of a current traffic of the terminal device.

* * * * *